United States Patent Office 2,901,369
Patented Aug. 25, 1959

2,901,369

PROCESS OF FORMING FOAMED ASPHALT

Otto Pordes, Windsor, Berks, England, assignor to Shell Development Company, New York, N.Y., a corporation of Delaware No Drawing. Application August 8, 1957
Serial No. 676,918

Claims priority, application Great Britain
January 16, 1957

9 Claims. (Cl. 106—122)

This invention relates to improvements in the production of foamed asphalt.

Hitherto foamed asphalt has been prepared either by directing a current of air against a stream of melted asphalt under such conditions that the air became entrained in the asphalt as it solidified, or by adding a gas generating agent such as sodium bicarbonate or ammonium carbonate to the melted asphalt. However, it has been found that if these methods are used the bubble size is uncontrolled and variable, resulting in finished articles, which have certain undesirable properties, e.g., that of absorbing water too rapidly.

The object of this invention is to provide a process for the production of foamed asphalt in which the bubble size is capable of being controlled and which gives a foamed asphalt of a lower bulk density and lower permeability to water.

I have now discovered that this object can be achieved if the foamed material is produced by decomposing a gas generating agent in softened asphalt in the presence of an oil-soluble surface-active agent.

Accordingly, the present invention provides a process for making foamed asphalt which comprises heating the asphalt in which is dispersed a gas generating agent (as hereinafter defined) and an oil-soluble surface-active agent soluble in asphalt, to a temperature above the decomposition temperature of the gas generating agent but below the temperature at which the viscosity of the asphalt falls to such a low value that substantial loss of emitted gas occurs, maintaining the mixture at the said temperature until the desired foam volume has been obtained and cooling the foamed material.

The material produced by the process of this invention is mechanically strong enough to allow handling and storing and will not show any appreciable deformation under normal atmospheric conditions. Furthermore, it can be heated and bent into shape very easily and since its sound and heat insulating properties are very good it provides a cheap, effective and convenient material for sound, heat and cold insulation of all kinds. A further advantage of this material is that it can be produced on the site where it is to be used, thus saving considerable transport costs.

The product produced by the process of the present invention is superior to that obtained by the previously known methods in that it has a lower bulk density and it absorbs water at a much lower rate. This last mentioned point is particularly important since absorption of moisture increases thermal conductivity and so decreases the value of the material for cold insulation work.

The oil-soluble surface-active agent employed in the method according to the present invention may be a cationic, anionic or nonionic surface-active agent, and will usually contain at least one hydrocarbon radical composed of at least 8 carbon atoms, and at least one polar group. Typical oil-soluble surface-active agents which may be employed are long chain amines, metal soaps, such as those of aluminum and zinc, sulfated fatty oils, sulfonated mineral oils, and lecithin and other oil-soluble organic phosphorus compounds.

A preferred class of surface-active agents is composed of the oil-soluble cationic surface-active agents such as amino compounds having at least 8 carbon atoms in the molecule and especially the oleophilic quaternary ammonium compounds. The quaternary ammonium compounds which have been found to be especially effective are those which contain at least one and preferably two aliphatic hydrocarbon chains of 8 or more carbon atoms, such as trimethyl octadecyl ammonium chloride, trimethyl octadecadienyl ammonium chloride, trimethyl hexadecyl ammonium chloride, trimethyl tetradecyl ammonium chloride, trimethyl octadecenyl ammonium chloride, dimethyl dioctadecyl ammonium chloride, dimethyl dihexadecyl ammonium chloride, dimethyl ditetradecyl ammonium chloride, dimethyl octadecyl octadecenyl ammonium chloride, dimethyl octadecenyl octadecadienyl ammonium chloride, diethyl dihexadecyl ammonium chloride and ethyl propyl dioctadecyl ammonium chloride. While the quaternary ammonium chlorides have been exemplified above, the corresponding bromides, acetates or hydroxides may be employed. It will be further understood that the short chain radicals present in each of the above-designated quaternary salts are more or less immaterial, but may be preferably aliphatic radicals having from 1 to 7 carbon atoms. Mixtures of these quaternary ammonium compounds may also be used. Commercially available quaternary salts of the above variety are usually materials wherein the long chain radicals have from 12 to 18 carbon atoms each.

Suitable oil-soluble surface-active agents also include the alkylamines having at least 8 carbon atoms, and preferably from 12 to 24 carbon atoms, in the molecule, as well as oil-soluble salts thereof, such as their acetates. Preferably, these are primary or secondary amines such as dodecylamine, heptadecylamine and octadecylamine. Cyclic organic nitrogen bases may be employed in the present process and include especially the alkylated imidazolines, such as heptadecyl imidazoline, the alkylated pyrimidines, benzidine, and diphenylamine. Other surface-active agents which have been found to be useful include oil-soluble partial amides or alkylene diamines or of polyalkylene polyamines or oil-soluble salts of such partial amides. Typical examples are oleylamidoethylamine oleate and aminoethyl stearamide. Complex polyamino compounds also useful in the present method include the amines obtained by the chlorination and subsequent ammonolysis of paraffin wax, the higher fatty acid salts of polyamines derived from the interaction of acrolein and ammonia and the adducts of hydrogen sulfide and diallyl amine.

A special variety of complex polyamines which may be employed comprises those containing both hydroxy and amino radicals obtained, for example, by the action of ethylene oxide or ethylene glycol on polyethylene polyamines or by condensation of epihalohydrins with ammonia or amino compounds. The partial amides, obtained by reaction of these complex polyamines with carboxylic acids having at least 7 carbon atoms in the molecule may also be used.

The ammonia-epichlorohydrin condensation products may be mixed with an oleophilic acid or mixtures thereof, such as tall oil or higher fatty acids derived from animal or vegetable oils or the partial oxidation products of hydrocarbon mixtures such as various petroleum fractions, and the mixture heated at a temperature from about 150° C. to about 225° C. for a period of from about 15 minutes to about 2 hours, or longer if desired, whereby the ammonia-epichlorohydrin product is converted to an amide. Representative of fatty acids suitable for the production of these amides are lauric, oleic, linoleic, palmitic, stearic and carnaubic acid. Various naphthenic acids recoverable from petroleum fractions may be used, as well as resin acids such as abietic acid and pimaric acid, and other cyclic acids such as salicylic acid and alkyl salicylic acids. Acid mixtures such as may be obtained from oxidized waxes, coconut fat, wool fat and castor oil, are also well adapted for use in the preparation of these oil-soluble surface-active agents.

Further, oil-soluble surface-active agents useful in the present invention include the oleophilic salts of carboxylic and organic sulfonic acids. A preferred group of this type is composed of the polyvalent metal salts and particularly the amphoteric metal salts of carboxylic acids, especially those wherein the carboxylic acids are fatty acids having at least 12 carbon atoms in the molecule. Other types of acids forming suitable soaps include petroleum naphthenic acids, acids derived from animal, plant and fish oils, rosin acids and tall oil acids. Specific examples are aluminum stearate, the aluminum salt of 12-hydroxy stearic acid, calcium naphthenate and zinc stearate. Monovalent metal sulfonates such as the alkali metal salts of petroleum sulfonic acids such as the sodium petroleum sulfonates, or sulfosuccinic acid such as the sodium salt of sulfo di-iso-octyl succinic acid may also be employed.

Acidic oil-soluble surface-active agents may be used. Preferably these are the higher molecular weight organic acids, such as carboxylic, sulfinic, sulfonic and organic sulfuric acids, having 12 or more carbon atoms in the molecule. Typical examples of such acids are stearic acid, linoleic acid, tetradecane-1-sulfonic acid, dodecane-1-sulfonic acid, and the products resulting from the sulfonation of fatty oils or the sulfonation of mineral oils, such as the petroleum sulfonic acids. Hydroxy fatty acids, such as 12-hydroxystearic acid, are also effective.

Further surface-active agents effective in the present method are the non-ionic surface-active agents, such as the oil-soluble hydroxyl-containing organic compounds, for example the oil-soluble glycols, partially hydrolyzed glycerides, high molecular weight monohydric alcohols, and condensation products of ethylene or propylene glycol with alcohols or carboxylic acids. Typical examples of such compounds are glycerol monostearate, hydrogenated castor oil, cetyl alcohol, 1,10-decamethyleneglycol and the condensation products of ethylene oxide with naphthenic acids.

Numerous organic compounds containing phosphorus may be employed as oil-soluble surface-active agents in this method. Examples thereof include the partial esters of various phosphoric acids, especially orthophosphoric acid, and the phosphonic acids. Blown or oxidized fatty oils which have been phosphated with phosphoric acid to form oil-soluble surface-active agents, and the lecithins which are naturally-occurring esters of distearyl-glycerophosphoric acid with chlorine are examples of the phosphorus compounds which may be used.

In this specification "gas generating agent" means a substance which is stable at room temperature but which decomposes with the evolution of gas at a temperature below 450° C. Such substances may be inorganic, for example, sodium bicarbonate, ammonium carbonate or hydrated ammonium alum or organic, for example, urea, diazoaminobenzene or dinitrosopentamethylene tetramine.

Any type of asphalt may be used but the particular type used will depend upon the physical properties desired of the foamed material. Thus it may be derived from asphaltic, semi-asphaltic or non-asphaltic crude petroleum oils and preferably those which form rigid masses at ambient temperatures. It may be naturally-occurring or prepared by subjecting residual petroleum oils to treatments such as steam or vacuum distillation. It may also be straight-run, steam refined or so-called blown asphalt. In order to produce precast slabs of foamed asphalt mechanically strong enough to allow handling and storing and which show no appreciable deformation under normal atmospheric temperatures, it is preferable to select a blown asphalt as starting material. Asphalts which are preferably used in the process of this invention include not only those obtained by blowing asphaltic mineral oil residues with air or other oxygen-containing gas, but also those obtained by treating the residues with, for example, potassium permanganate or substances such as dinitrocresol, picric acid and aromatic sulphonic acids, whereby even without the use of the usual oxidizing agents, asphalts similar to those of the blown type are obtained. In the preparation of blown asphalts or similar materials a catalyst e.g., ferric chloride may be used. The process of this invention is preferably carried out using a blown asphalt with a ring and ball softening point within the range of 85° C. to 135° C. and a penetration at 24° C. within the range 10 to 40.

The surface-active agent may be added to the asphalt to be foamed after the latter has been warmed to facilitate mixing or it may first be mixed with a small amount of softener grade asphalt and then this mixture added to the main bulk of material.

The finely ground gas generating agent is added and vigorously mixed into the asphalt. To facilitate mixing, the asphalt may be softened by heating it, for example, to a temperature above its ring and ball softening point, before adding the gas generating agent. In practice it was found to be more convenient and easier to ensure even distribution of the gas generating agent for the latter to be added as a dispersion in a soft grade asphalt of 90 to 110 penetration at 25° C. This dispersion may be prepared by mixing equal parts by weight of gas generating agent and soft grade asphalt at a temperature of about 100° C. and stirring until a homogeneous mixture is obtained.

After even distribution of the gas generating agent in the asphalt has been ensured by vigorous stirring, the material is transferred to a mold and maintained at a temperature above the lowest temperature at which the gas generating agent will decompose with the evolution of gas but below the temperature at which the viscosity of the asphalt falls to such a low value that substantial escape of emitted gas occurs, until the desired volume of foamed asphalt is obtained. Preferably, a temperature of 100 to 200° C., preferably 130–170° C. is used. The time of heating required will naturally depend upon the quantities of reactants and the final bulk density required of the final product. If sodium bicarbonate is used as the gas generating agent a ratio of asphalt to bicarbonate of about 10:1 and about 2 hours heating at 130° C. to 150° C. will give a product with a bulk density of about 0.2 to 0.25.

The following examples illustrate the invention:

Example 1

100 parts by weight of blown asphalt having a ring and ball softening point of 115° C. and a penetration at 25° C. of 15 was heated to 175° C. after which 2 parts by weight of aluminum stearate was mixed into the asphalt and the resulting mixture stirred well. A sodium bicarbonate asphalt dispersion was then prepared by adding sodium bicarbonate (5 parts by weight based on the blown asphalt) to equal parts by weight of soft grade asphalt (having a penetration at 25° C. of 100), heating to 100° C. and stirring until a homogeneous mixture was obtained. This sodium bicarbonate dispersion was then added and vigorously mixed into the heated blown asphalt containing aluminum stearate. The material was transferred from the mixing pan into a mold and put into an oven at 135° C. After 2 hours, the foamed material which had a bulk density of 0.2 was allowed to cool to room temperature and was cut out from the mold.

For the sake of comparison the experiment was repeated using the same quantity of sodium bicarbonate but no aluminum stearate and it was found that the bulk density of the product was about 15% higher.

Further comparison of the properties of foamed materials made with and without the addition of an oil-soluble surface-active agent was obtained when slabs of the two materials of about equal size and bulk density were placed on water containing "Teepol." (The name "Teepol" is a registered trademark and designates a mixture of sodium salts of higher secondary alkyl sulfates, derived from paraffin wax and used as a detergent.) The specimens made without the surface-active agent had sunk into the water after 24 hours to over 60% of their volume whereas the specimens made with the surface-active agent had sunk only to 17% of their volume.

The rates at which both materials absorbed water were compared by completely immersing two specimens, each weighing 20 grams and of equal bulk density in water containing "Teepol." The first specimen (A) was prepared by the process of this invention whereas the other specimen (B) was prepared in a similar way except that no oil-soluble surface-active agent was used. The following results were obtained:

| Time of Immersion | Water absorbed in grams | |
|---|---|---|
| | A | B |
| 1 min | 27 | 65 |
| 1 hour | 31 | 66 |
| 20 hours | 41 | 73 |
| 44 hours | 46 | 74 |

*Example II*

Another specimen of foamed asphalt was prepared in the same way as described in Example I except that blown asphalt having a ring and ball softening point of 135° C. and a penetration at 25° C. of 10 was used. The product had a bulk density of 0.2. The rates of absorption of water by specimens made with the use of an oil-soluble surface-active agent (A) and without the use of surface-active agent (B) were measured as described in Example I except that each specimen weighed 40 grams and "Teepol" was not added to the water until 68 hours after the specimens were immersed. The following results were obtained:

| Time of Immersion | Water absorbed in grams | |
|---|---|---|
| | A | B |
| 1 min | 0 | 47 |
| 1 hour | 18 | 65 |
| 18 hours | 42 | 107 |
| 26 hours | 62 | 111 |
| 44 hours | 79 | 117 |
| 68 hours "Teepol" added to water | 86 | 122 |
| 73 hours | 95 | 126 |

I claim as my invention:
1. A process for the manufacture of foamed asphalt which comprises heating asphalt in which is dispersed a gas generating agent and an oil-soluble surface-active agent containing at least 1 hydrocarbon radical having at least 8 carbon atoms and at least 1 polar group, to a temperature of 100–200° C., said temperature being above both the softening point of the asphalt and the decomposition temperature of the gas generating agent but below the temperature at which the viscosity of the asphalt falls to such a low value that a substantial escape of emitted gas occurs, maintaining the mixture at the said temperature until the desired foam volume has been obtained and cooling the foamed asphalt.

2. The process of claim 1 wherein the oil-soluble surface-active agent is aluminum stearate.

3. The process of claim 1 wherein the gas generating agent is sodium bicarbonate.

4. The process of claim 1 wherein the asphalt containing oil-soluble surface-active agent and gas generating agent is heated to a temperature of between 100° C. and 200° C.

5. The process of claim 1 wherein the asphalt containing oil-soluble surface-active agent and gas generating agent is heated to a temperature between 130° C. and 170° C.

6. The process of claim 1 wherein the asphalt treated is a blown asphalt.

7. The process of claim 6 wherein the blown asphalt has a ring and ball softening point between 85° C. and 135° C.

8. The process of claim 7 wherein the blown asphalt has a penetration at 25° C. of between 10 and 40.

9. The process of claim 1 wherein the gas generating agent is added in the form of a dispersion in a softer grade asphalt having a penetration at 25° C. of between 80 and 120.

References Cited in the file of this patent

UNITED STATES PATENTS

| | | |
|---|---|---|
| 1,381,118 | Gerlach | June 14, 1921 |
| 1,401,974 | Fischer | Jan. 3, 1922 |
| 2,023,068 | Flood | Dec. 3, 1935 |
| 2,286,414 | Hersberger | June 16, 1942 |
| 2,386,163 | Holmes | Oct. 2, 1945 |
| 2,461,971 | Fischer | Feb. 15, 1949 |
| 2,554,461 | Hornes et al. | May 22, 1951 |